Figure 1:
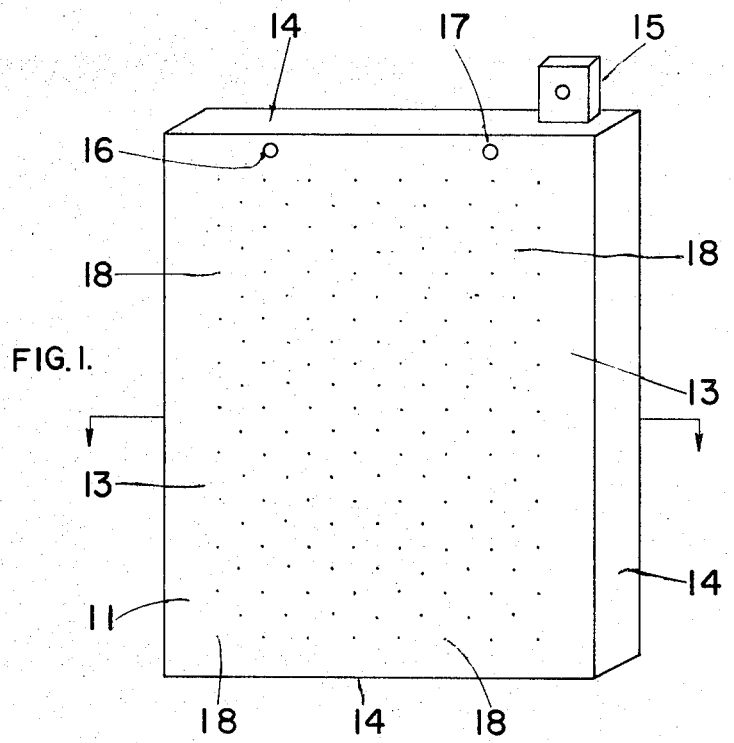

United States Patent [19]
Edwards et al.

[11] 3,785,867
[45] Jan. 15, 1974

[54] BATTERY PLATES COMPRISING A MULTIPLICITY OF PERFORATED METALLIC FOIL ELEMENTS AND A BATTERY UTILIZING SAME

[75] Inventors: Joseph Edwards, Bishopston, Wales; John Edward Whittle, Sutton Coldfield, both of England

[73] Assignee: The International Nickel Company, Inc., New York, N.Y.

[22] Filed: Jan. 31, 1972

[21] Appl. No.: 222,019

Related U.S. Application Data
[63] Continuation-in-part of Ser. No. 28,929, April 15, 1970, abandoned.

[52] U.S. Cl. .................. 136/6 R, 136/24, 136/28, 136/70
[51] Int. Cl. ......................................... H01m 43/04
[58] Field of Search .................. 136/36, 37, 50, 64, 136/65, 75–78, 19, 20, 24, 28, 29, 30, 26–27, 6, 120, 143, 70, 68; 204/11–13, 56

[56] References Cited
UNITED STATES PATENTS

| | | | |
|---|---|---|---|
| 910,991 | 1/1909 | Cole | 136/143 |
| 1,087,236 | 2/1914 | Hubbell | 136/24 |
| 1,402,751 | 1/1922 | Edison | 136/28 |
| 2,928,888 | 3/1960 | Vogt | 136/6 |
| 3,069,486 | 12/1962 | Solomon et al. | 136/30 |
| 3,320,139 | 5/1967 | Golben et al. | 204/35 |
| 3,305,401 | 2/1967 | Aulin | 136/120 |
| 3,441,440 | 4/1969 | Silverstone | 136/29 |

OTHER PUBLICATIONS
J. McCallum et al., "Development of Large–Internal–Surface–Area–Nickel–Metal Plaques," Sept., 1965–Batelli Memorial Institute.

*Primary Examiner*—Anthony Skapars
*Attorney*—Maurice L. Pinel

[57] ABSTRACT

Battery plates for acid or alkaline batteries are made up of a multiplicity of perforated metallic foil elements stacked in face-to-face contact. The foil elements carry a surface deposit of battery active mass and the numerous perforations through the foil surfaces are generally uniformly distributed over the surface area. The holes in each foil element are substantially in register with the holes in the next adjacent foil element. In the stack, the foils are separated from one another by layers of battery active mass of at least twice the thickness of the foils. Electrical contact, in parallel among the foils, is attained by welding (or by other means of attaining a metallic conductive path) only at the periphery of the stack.

7 Claims, 2 Drawing Figures

BATTERY PLATES COMPRISING A MULTIPLICITY OF PERFORATED METALLIC FOIL ELEMENTS AND A BATTERY UTILIZING SAME

This is a continuation-in-part of application Ser. No. 28,929, filed Apr. 15, 1970, now abandoned.

The present invention relates to the construction of plates for use in acid or alkaline batteries.

The plates for alkaline batteries may be constructed in a number of well-known ways, for example, as tubular plates, pocket plates or sintered plates. The actual plate normally consists of a support which is inert to alkali on or within which is deposited or formed so-called "battery active mass," the active constituent of the plate. The support is most commonly of nickel and, for example, both the positive and negative plates of a nickel-cadmium battery may be made from nickel foil. In the case of the positive plate the nickel foil will carry battery active mass in the form of NiO(OH) which may conveniently be formed by the process described in the copending U.S. application Ser. No. 842,347 of T.S. Turner, filed July 16, 1969, now U.S. Pat. No. 3,579,383. In the case of the negative plate the battery active mass is cadmium and this is conveniently deposited on the nickel foil by electrodeposition in the manner described by I.H.S. Henderson and S.G. Ladan in an article entitled "The Preparation and Structure of Electrodeposited Sponge Cadmium Electrodes," Canadian Journal of Chemical Engineering, Vol. 46, Oct., 1968, pages 355–363. A nickel-cadmium battery of the type described will also include an alkaline electrolyte such as, for example, a solution of potassium hydroxide.

In the case of nickel-iron or nickel-zinc batteries, the negative plate may again be made of nickel foil bearing a deposit of iron or zinc or hydroxides of these metals, this battery active mass being produced by electrodeposition from solutions containing suitable salts of iron or zinc such as, for example, ferrous sulfate, ferrous chloride or zinc cyanide.

In providing plates for acid batteries in accordance with the invention, the foil is composed of a lead alloy or dispersion strengthened lead and the battery active mass at the positive plate is provided in the form of lead dioxide while at the negative plate the battery active mass is sponge lead. Such a battery would contain a solution of sulfuric acid as electrolyte.

In all designs of plate, whether for acid of alkaline batteries, clearly the battery active mass must be supported in such a way that the electric current flowing through the electrolyte can have easy access to it while at the same time, the battery active mass must be in intimate electron transfer relationship with the support which provides a metallic path for carrying electric current between the battery and that part of a circuit external of the battery. A plate construction in which such ready access and electron transfer relationship can be optimized, depending on the use for which the battery is intended, has now been discovered.

It is an object of the present invention to provide an improved battery plate constructed from perforated metal foil.

It is another object of the invention to provide a battery plate comprised of multiple layers of perforated nickel foil.

Figure 2:
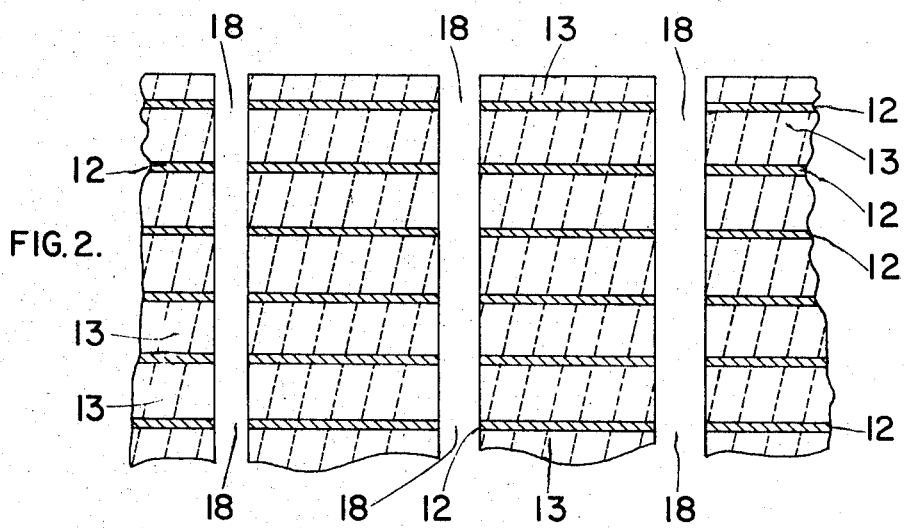

Other objects and advantages will become apparent from the drawing taken in view of the following description, in which FIG. 1 depicts a battery plate of the present invention and FIG. 2 is a highly enlarged cross-sectional view of the battery plate of FIG. 1 along the line 2—2.

Generally speaking, the present invention is directed to the construction of a battery plate formed from perforate metal foil elements having battery active mass on the surfaces thereof, the foil elements being stacked in face-to-face contact with substantially all the perforations in the foil elements in register and being electrically connected in parallel only at the periphery of the stack.

While the structure set forth in this invention is suitable for plates for both acid and alkaline batteries, the description which follows illustrates the invention in terms of plates for use in alkaline batteries. Further, while the invention is not limited in any way to nickel foil for use in battery plates, and the foil may be made of any metal suitably resistant to chemical or electrochemical attack in the battery electrolyte, nickel foil is used as the vehicle of description since both positive and negative plates of most forms of alkaline batteries are conveniently made using nickel as the support.

A battery plate in accordance with the invention is depicted in the drawing. Referring now thereto, battery plate 11 is made up of a plurality (i.e., at least three) of perforated metallic foil elements 12 which, as depicted are rectangular, but can be of any convenient shape. Active battery mass 13 which covers substantially all of the surface of foil elements 12 separates metallic foil elements 12 and forms the outer surfaces of battery plate 11 except for edges 14 which are welded. Welded edges 14 effectively interconnect metallic foil elements 12 in parallel. Tab 15, also welded to at least one foil element 12 provides means for connecting battery plate 11 in a conventional battery assembly.

Holes 16 and 17 serve to register perforations 18 in each of foil element 12 each with each other to provide passages which pass through battery plate 11. Perforations 18 are geometrically arranged in each of foil elements 12 so as to be substantially uniformly dispersed across the surface of foil element 12 and occupy about 3 percent to about 50 percent of the area of foil element 12. Battery active mass 13, which is microporous in nature, is situated so as not to block perforations 18. In use, the passages provided by registration of perforations 18 permit relatively free flow of low resistance electrolyte into the interior of battery plate 11 and direct contact with battery active mass adjacent said passages. Electrolyte trapped in the micropores of the battery active mass is thus in direct contact with free (or mobile) electrolyte providing relatively short paths of high electrical resistance within the battery plate. By closely spacing perforations 18 in foil elements 12 and limiting the total area of perforations 18 to about 5 percent to about 15 percent of the area of battery plate 11, one achieves a battery electrode having both a high energy density and high efficiency at high discharge rates. For any given ratio of thickness of active battery mass to metallic foil increasing the perforation area results in lowering energy density and, within limits, increasing the number of perforations per unit area increases the efficiency at rapid discharge rates and vice versa. Increasing the ratio of thickness of active battery mass to the thickness of the metal foil increases the energy density of the plate while at the same time increases the internal resistance of the plate. As a minimum, given metallic foils of a thickness of about 0.002 centimeter, the battery active mass separating each pair of foils should be about 0.004 centimeter thick, i.e., a ratio of about 2 to 1. More advantageously, the ratio is about 6 to 1 to about 40 to 1. When the ratio is as high as 60 to 1 a battery plate is obtained which has extremely high energy density but is limited by having a low discharge rate.

Preferably the perforated foils have been produced by electroforming, a process which is well known, and which is described, for example, in a paper entitled "Electrowinning of Nickel Screens" by J. van der Waals, which is abstracted in *Electroplating and Metal Finishing*, Vol. 16, No. 11, Nov. 1963, pages 393-394. The electroforming process is capable of producing a nickel foil having numerous small perforations but satisfactory perforations may also be produced by mechanical means such as contacting the foil with a roll provided with teeth to punch the desired holes. Advantageously, the foils will also have two or more relatively larger holes through them whereby they can be aligned by means of a spigot, so that the perforations in the assembled plate are in register. Registration of the perforations in the battery plate is important because, in the absence of such registration, access of current to the interior of the plate is restricted and there is a sharp rise in the internal resistance of the plate.

The metal foils will normally be extremely thin, and in the case of nickel it is generally desirable to use foil having a thickness of from 0.0004 cm to 0.005 cm, most advantageously at the lower end of this range. The active mass produced on foil of this thickness (which in the case of nickel foil used as positive electrodes for nickel-cadmium batteries is nickel hydroxide) will itself normally have a thickness of between 0.0005 cm and 0.009 cm. To provide ratios of thickness of battery active mass to thickness of an adjacent foil of about 2 to 1 to about 36 to 1 when registered foils are stacked. The active mass may be present on one side or on both sides of the foil and will be deposited on the walls of the perforations. It is beneficial to have battery active mass on both sides of the foils and then to stack sufficient foils in contact face-to-face to produce a finished plate of about 1 mm. thickness. Clearly the thickness of the stack can be smaller or greater than this, depending on the purpose for which the battery is made. High discharge rates demand relatively thin plates; thicker plates are more economical in the number of separators required but beyond a certain point the gain in energy density resulting from the use of fewer separators is fully offset by the loss resulting from the need to increase the area of the perforations in the foil in order to avoid undue increase in the resistance to penetration by the current into the interior of the plate.

It has been found that the shape of the perforations and the position of the perforations in the foil are important to the functioning of a plate according to the invention when operating within a battery. The internal resistance of the plate and the output of the plate may be controlled by suitable choice of the size, distribution and shape of the holes. Thus the total area of holes per unit area of foil is determined by the plate-thickness chosen and the service requirements of the battery in which the plate will be used. It is an advantage of the invention that the total area of the holes need only be a small proportion of the area of the foil; generally speaking this proportion will be at least 3 percent, but will not exceed 50 percent, and good results are obtained when the proportion is from 5 percent to 15 percent. It is desirable that the holes should be uniformly distributed and individually small, say from 0.01 $mm^2$ to 1 $mm^2$ in area. By choosing the smallest size of the hole consistent with practical considerations of manufacture and stacking the number of holes per unit area can be made as large as the limit on total hole area will allow, and in this way, the distance between adjacent holes is made as small as possible. With a given total hole area, decreasing the size of individual perforations decreases the spacing between the holes and thereby lowers the internal resistance of the plate. Generally, there will be between 4 and 4,000 holes per square centimeter in the foils employed for the purposes of this invention. Compared with a circular shape there is the advantage to be gained from elongated holes that the total hole periphery is increased for a given total hole area and this lowers the internal resistance of the plate by improving access of the current to the active mass.

In all batteries, the plates of opposite polarity need to be spaced apart with separators to prevent contact between them. At the same time it is necessary for the ions in the electrolyte to be able to pass through the separators. Suitable separators may be made from a wide variety of insulating materials including nylon, polypropylene and polytetrafluoroethylene. Depending on the type of separators used, it may be advantageous to arrange for the separators to possess perforations similar to those provided in the plates and furthermore to arrange the construction of the battery so that the perforations in the plates and in the separators are in register to facilitate rapid movement of the ions in the electrolyte.

As an example, two plates were prepared in similar fashion, each 2.54 cm square and 0.0178 cm thick with 10 layers of electroformed nickel foil of 0.0005 cm thickness. The nickel foil elements bore a layer of battery active mass 0.0007 cm thick composed of nickel hydroxide. This battery active mass was formed by placing the perforated nickel foil elements in a solution comprising 250 parts by volume of a solution of $Ni(NO_3)_2 \cdot 6H_2O$ having a concentration of 750 grams per liter, 6.25 parts by volume of concentrated $HNO_3$ solution and 20 parts by volume of $NH_3$ solution (specific gravity 0.880). A current of 5 milliamperes per square centimeter was passed for a period of 15 minutes to develop the desired layer of battery active mass on both sides of the foil.

In plate 1, the nickel foil had 11 perforations per square centimeter, and in plate 2, the nickel foil had 174 perforations per square centimeter, the radius of the holes and the center-to-center distance between adjacent holes in plate 1 being 0.0526 cm and 0.322 cm and in plate 2 being 0.0121 cm and 0.079 cm. The total area of the holes in the case of plate 1 was about 10 percent and in the case of plate 2 was about 8 percent. In the plates, the foil perforations were substantially in register and the foils were welded together along one edge. The maximum internal resistance at completion of discharge of plate 1 was found to be 0.984 ohms, and that of plate 2 was found to be 0.105 ohms.

The plates were charged and discharged several times in potassium hydroxide solution having a specific gravity of 1.29, and their capacities at different rates of discharge determined. The values obtained are given in the following Table in which mA is milliamperes and mAh is milliampere hours.

TABLE I

| Plate | Discharge Rate mA | Time of Discharge (secs) | Capacity mAh |
|---|---|---|---|
| 1 | 130 | 382 | 13.8 |
|  | 1300 | 12.8 | 4.6 |
| 2 | 117 | 420 | 13.7 |
|  | 1170 | 30.8 | 10.0 |

The superiority of plate 2 at the higher rate of discharge is clearly shown and it exhibits the effect of the lower internal resistance of plate 2 owing to the close spacing of the holes.

In a further example two plates were prepared from nickel foil in the form of a square of 50 mm., side thickness 0.0064 mm., having a hole configuration the same as for plate 1 above and bearing 0.04 mm. of active mass on each face. The first of these plates, plate 3, comprised 10 such foils and the second plate, plate 4, was a single foil. These plates were charged and discharged in potassium hydroxide solution as in the previous example and their capacities at different rates of charge determined with the results as tabulated below.

TABLE II

| Plate | Number of foils | Discharge Rate mA | Discharge Rate mA/cm² | Time to discharge in hours | Capacity mAh | Capacity mAh/cm² |
|---|---|---|---|---|---|---|
| 3 | 10 | 106 | 0.21 | 4.27 | 452 | 0.904 |
|  |  | 816 | 1.63 | 0.455 | 371 | 0.742 |
| 4 | 1 | 10.1 | 0.20 | 4.66 | 47.1 | 0.943 |
|  |  | 84 | 1.68 | 0.50 | 41.8 | 0.836 |

It will be seen that the capacity of the 10-layer plate, plate 3, is close to the ideal obtained for the single layer foil, and this remarkably small loss of capacity is truly surprising when one considers the stacking of the 10-foils in a face-to-face relationship, thereby exhibiting the advantages of the invention. It is also important to keep in mind when comparing plates 3 and 4 that plate 4 is not a practical plate. The single foil construction of plate 4 lacks the rigidity required in a commercial battery. Further, a battery made of a plurality of plates as plate 4 would require a large number of separators thus lowering the energy density of the battery tremendously. When a plate is made up of a plurality of foils (an extreme minimum number of 3 being used only with relatively thick foil, e.g., about 0.005 centimeter thick) it achieves the necessary degree of mechanical rigidity required in commercial use and can, as shown by the comparison of plates 3 and 4, retain the electrochemical advantages of a single foil plate. If metallic sheets of thickness greater than about 0.005 centimeter thick are used, either the energy density of the plate produced with such sheets is so small or the internal resistance is so high that the plate is completely impractical in terms of present day battery technology.

There has thus been disclosed a relatively simple plate structure for batteries with substantially improved electrical properties, i.e., a relatively large electrical output at high discharge rates.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A laminate battery plate adapted to be electrochemically charged and discharged repeatedly comprising at least three foils of metal inert to battery electrolyte each about 0.0004 to about 0.005 centimeter thick in parallel metal-to-metal electrical connection positioned coextensive with and essentially parallel to each other and spaced apart from each other by layers of substantially uniform thickness of microporous, electrochemically active battery mass adapted to be saturated with electrolyte, the two outer foils each having a layer of said microporous electrochemically active mass on the outer surface thereof, said electrode being constructed and arranged so that the thickness of said microporous electrochemically active mass separating each pair of said metallic foils is at least twice the thickness of each said metallic foil, so that a multiplicity of uniformly dispersed, essentially parallel holes adapted to contain mobile electrolyte penetrate through said electrode in a direction normal to the planes of said foils at each hole loci, said holes being of a density of at least 4 per square centimeter of external electrode area and being of diameters such that the total area of said holes is about 3 percent to about 50 percent of the total external area of said electrode and so that said foils are in direct metal-to-metal contact with each other only at the periphery thereof.

2. The battery plate of claim 1 wherein the foil elements are composed of nickel.

3. The battery plate of claim 1 wherein the hole area does not exceed 15 percent of the total external area of said battery plates.

4. A battery containing a suitable electrolyte and having a plurality of battery plates therein of the type set forth in claim 1 and having perforated insulating separators between adjacent battery plates with the perforations thereof substantially all in register with the foil element perforations.

5. The battery of claim 4 wherein the foil elements are composed of nickel and the electrolyte is potassium hydroxide.

6. A battery comprising a plurality of battery plates of the type set forth in claim 2 and having perforated insulating separators between battery plates of opposite polarity with the perforations therein substantially all in register with the foil element perforations.

7. The battery of claim 6 wherein the hole area of the battery plates and separators does not exceed 15 percent of the external area of said battery plate or separator.

* * * * *